(12) United States Patent
Doak et al.

(10) Patent No.: US 11,223,128 B2
(45) Date of Patent: Jan. 11, 2022

(54) MULTI-FREQUENCY MULTIPLEXED SIGNAL DISTRIBUTION FOR PHASED ANTENNA ARRAY

(71) Applicant: Lockheed Martin Corporation, Bethesda, MD (US)

(72) Inventors: Robert C. Doak, Swedesboro, NJ (US); Leon J. Slezak, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 296 days.

(21) Appl. No.: 16/009,952

(22) Filed: Jun. 15, 2018

(65) Prior Publication Data

US 2019/0386391 A1    Dec. 19, 2019

(51) Int. Cl.
*H01Q 3/34* (2006.01)

(52) U.S. Cl.
CPC ..................... *H01Q 3/34* (2013.01)

(58) Field of Classification Search
CPC .. H01Q 3/34; H01Q 3/22; H01Q 3/42; H01Q 25/00; G01S 1/02
USPC ........................................................ 342/371
See application file for complete search history.

(56) References Cited

U.S. PATENT DOCUMENTS

| 2006/0068707 | A1* | 3/2006 | Greeley | H04B 7/0845 455/42 |
| 2018/0342804 | A1* | 11/2018 | Hasegawa | H01Q 3/2682 |

* cited by examiner

*Primary Examiner* — Harry K Liu
(74) *Attorney, Agent, or Firm* — Baker Botts L.L.P.

(57) ABSTRACT

A phased array radar system includes a first input signal source configured to generate a first input signal (e.g., a clock signal), and a second input signal source configured to generate a second input signal (e.g., a local oscillator signal). A multiplexer is operatively connected to the first and second input signal sources, and is configured to selectively route the first and second input signals onto a single output channel. At least one signal dividing device is operatively connected to the single output channel, and is configured to generate a plurality of output signals from a signal received from the signal multiplexer. A plurality of signal demultiplexers are also provided, with each demultiplexer responsive to one of the plurality of output signals for routing the output signal to one of a plurality of output channels. A plurality of radar receivers and/or exciters are operatively connected to the plurality of output channels of the plurality of multiplexers.

8 Claims, 3 Drawing Sheets

# MULTI-FREQUENCY MULTIPLEXED SIGNAL DISTRIBUTION FOR PHASED ANTENNA ARRAY

FIELD OF THE INVENTION

The present disclosure relates to a signal distribution system or network, and more specifically, a phased antenna array signal distribution network.

BACKGROUND

Signal processing systems, such as radar and sonar systems, are useful for detecting, characterizing and monitoring various kinematic parameters associated with natural and/or man-made objects. Such systems are important for both civilian and military operations. In radar systems, for example, one or more transmitted electromagnetic (EM) signals, referred to herein as radio frequency (RF) waveforms or pulses, are intended to engage one or more objects or targets. Reflected return signals (or echoes) are received and processed for object identification and characterization. Several types of transmitted signals may be used. For example, single pulse, multiple pulse, and linear frequency modulated (LFM) waveforms may be used, with each waveform type having particular advantages in terms of target detection and velocity and acceleration estimation, by way of example only.

Radar systems use different signal sources for controlling, for example, frequency conversion and operational timing of various components, such as digital-to-analog converters, analog-to-digital converters, and digital processors. Within a phased-array antenna comprising numerous antenna elements under individual control, each of these control signals is typically distributed by their own network of power splitters connected by coaxial cable assemblies. Accordingly, a large network of physical cables and other hardware may be required to distribute these signals to a large number (e.g., hundreds to thousands) of locations on the array, despite the destination points of the different signals being in relatively close proximity. These large networks required for each frequency or control signal creates packaging complexity and the large hardware count for the network can be costly.

Improved systems and methods for more efficiently distributing radar system control signals are desired.

SUMMARY

In one embodiment of the present disclosure, a phased array radar system is provided. The system includes a first input signal source configured to generate a first input signal, and a second input signal source configured to generate a second input signal. A multiplexer is provided and operatively coupled to the first and second input signal sources, and is configured to selectively route the first and second input signals onto a single output channel. At least one signal dividing device is operatively connected to the single output channel, and is configured to generate a plurality of output signals from a signal received from the signal multiplexer. A plurality of signal demultiplexers are also provided, with each demultiplexer responsive to one of the plurality of output signals for routing the output signal to one of a plurality of output channels. A plurality of radar receivers and/or exciters are operatively connected to the plurality of output channels of the plurality of multiplexers.

According to another embodiment of the present disclosure, a system for distributing signals within a phased array radar system is provided. The system includes a signal multiplexer comprising a plurality of inputs, each responsive to a signal source. The multiplexer is configured to selectively route signals received at the plurality of inputs onto a single output channel or signal line. At least one signal dividing device of the system is operatively connected to the single output channel and is configured to generate a plurality of output signals from a signal received from the signal multiplexer. At least one signal demultiplexer of the system is configured to be associated with at least one of a radar transmitter and a radar receiver, and is responsive to one of the plurality of output signals for routing the output signal to one of a plurality of output channels operatively connected to the at least one radar transmitter and radar receiver.

According to another embodiment, a method for distributing signals in a phased array radar system comprises the steps of: 1) selectively routing a plurality of input signals onto a single output channel via a signal multiplexer; 2) splitting or dividing the single output channel into a plurality of output signals via a signal dividing device; and 3) routing each of the plurality of output signals to one of a plurality of input channels of a plurality of radar receivers and/or exciters via a plurality of signal demultiplexers.

DETAILED DESCRIPTION

Figure 1:
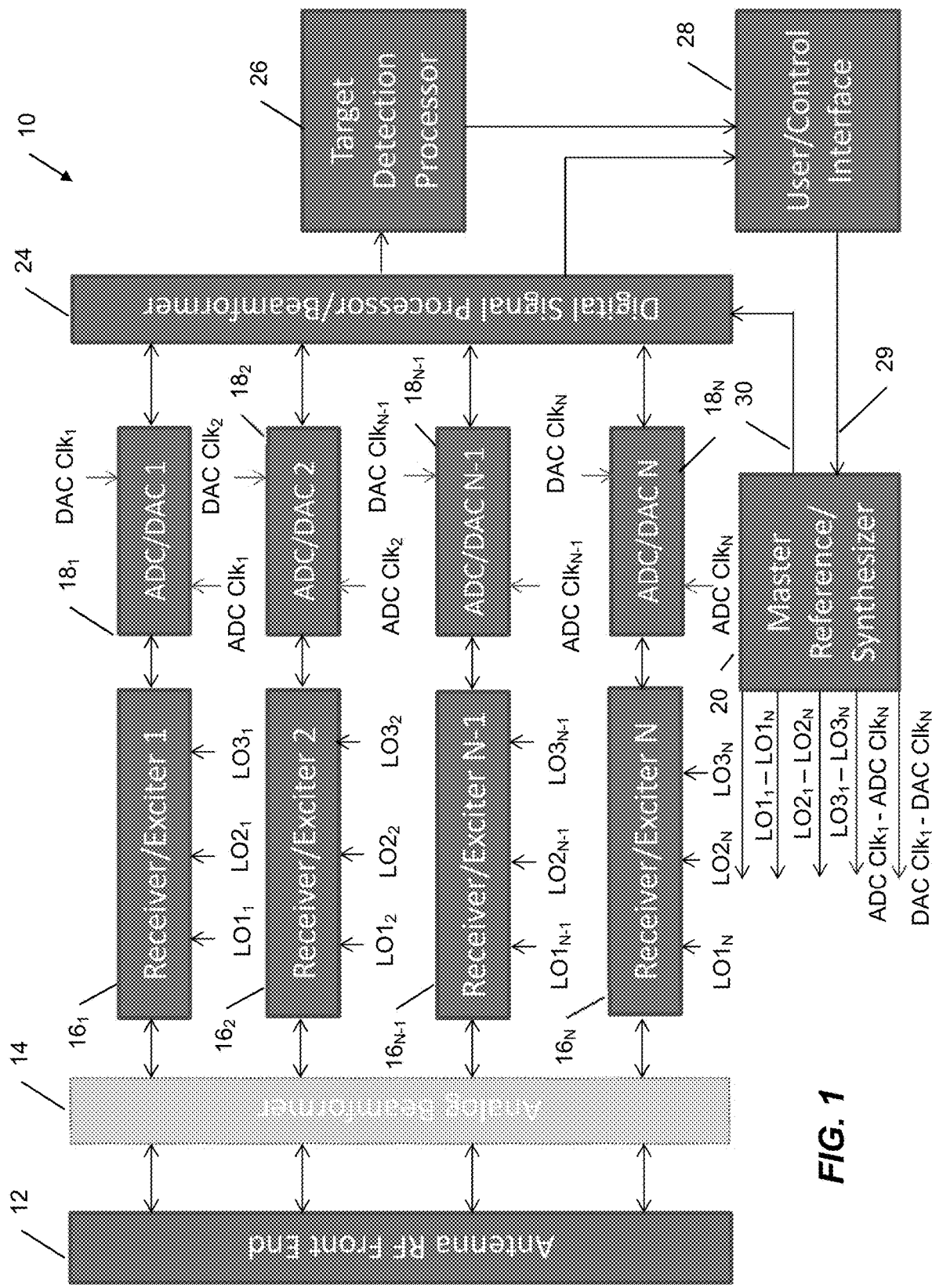
FIG. 1 is a simplified schematic diagram of a phased array radar system according to an embodiment of the present disclosure.

It is to be understood that the figures and descriptions of the present invention have been simplified to illustrate elements that are relevant for a clear understanding of the present invention, while eliminating, for purposes of clarity, many other elements found in signal processing and distribution systems, including radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include a signal distribution system and architecture for use in a signal processing system (e.g. a radar system) that reduces cost and space requirements, and increases efficiency. More specifically, embodiments of the present disclosure provide an improved phased array radar system, including a plurality of input signal sources. A multiplexer is provided and operatively coupled to the plurality of input signal sources and is configured to selectively route received input signals onto a single output channel. At least one signal dividing device is operatively connected to the single output channel and is configured to generate a plurality of output signals from a signal received from the signal multiplexer. A plurality of demultiplexers are also provided, with each demultiplexer responsive to one of the plurality of output signals for routing the output signal to one of a plurality of radar receivers and/or exciters via a plurality of output channels of the demultiplexer.

Referring generally to FIG. 1, embodiments of the present disclosure will be described herein as implemented into an exemplary phased array radar system 10. Radar system 10 comprises an antenna front end 12 including a plurality of RF antenna elements and amplifiers for transmitting and/or receiving RF signals. In the exemplary system 10, receivers and exciters are embodied as a plurality of N integrated digital receiver/exciter elements (DREX) $16_{1-N}$ arranged in parallel with one another. In other embodiments, separate exciters and receivers may be provided without departing from the scope of the present disclosure. As will be understood by one of ordinary skill in the art, receivers/exciters $16_{1-N}$ are responsive to input signals received from a digital signal processor 24 or waveform generator via a plurality of digital-to-analog converters (DACs) $18_{1-N}$ for generating RF signals to be provided to antenna front end 12. Selective control of DACs $18_{1-N}$ may be provided via a plurality of respective clock signals DAC $Clk_{1-N}$ (e.g., 1000 MHz signals). An optional analog beamformer 14 comprising a plurality of combiners and splitters may be provided for distributing the desired RF waveforms to the antenna front end 12 (on transmit) and distributing the returned RF signal to receivers/exciters $16_{1-N}$ (on receive). In other embodiments, analog beamformer 14 may be replaced by or supplemented with a fully-digital arrangement, wherein digital signal processor or beamformer 24 provides some or all of the beamforming functions.

Waveforms transmitted by antenna front end 12 are reflected off of one or more targets, generating return signals or echoes. Return signals are captured by antenna front end 12 and communicated to receivers/exciters $16_{1-N}$ for analog signal processing, including down conversion operations. Receivers/exciters $16_{1-N}$ may include various processing components, such as one or more filters, low-noise amplifiers and down converters, as will be understood by one of ordinary skill in the art. The outputs of receivers/exciters $16_{1-N}$ are provided to respective analog-to-digital converters (ADCs) $18_{1-N}$ for converting received analog return signals to digital form for further processing by digital signal processor 24. Selective control of ADCs $18_{1-N}$ may be provided via a plurality of respective clock signals ADC $Clk_{1-N}$ (e.g., 250 MHz signals). Digital signal processor 24 may include, for example, pulse compression module(s) (not shown) operative to receive post-A/D digitized in-phase and quadrature-phase (I/Q) signal data from the output of ADCs $18_{1-N}$. An output or outputs of digital signal processor 24 may be provided to, by way of non-limiting example, a detection processor 26 for performing target detection operations.

Referring again to receivers/exciters $16_{1-N}$, in one exemplary embodiment, each receiver/exciter $16_{1-N}$ includes one or more electronic or local oscillators (LOs) for generating signals of a desired frequency used in the up or down conversion or heterodyning operations performed thereby. In other embodiments of the present disclosure, external LOs may be implemented, with their outputs selectively provided to a respective one of receivers/exciters $16_{1-N}$ for performing frequency mixing operations.

Receivers/exciters $16_{1-N}$ typically require LO signals at different frequencies or may require multiple LO signals. As illustrated in FIG. 1, exemplary LO signals $LO1_{1-N}$, $LO2_{1-N}$, $LO3_{1-N}$ indicative of desired discrete LO frequencies are provided to respective receivers/exciters $16_{1-N}$ to be utilized in frequency conversion processing. For example, each receiver of receiver/exciter $16_{1-N}$ may require a first LO signal ($LO1_{1-N}$) in the 4000 MHz to 4500 MHz frequency range and a second LO signal ($LO2_{1-N}$) at 1500 MHz, while each exciter of receiver/exciter $16_{1-N}$ may require a third LO signal ($LO3_{1-N}$) in another distinct frequency range.

Radar system 10 may further comprise a master reference or synthesizer 20, which may include one or more signal generators and/or processing components. Master reference 20 is configured to generate and selectively output LO signals $LO1_{1-N}$, $LO2_{1-N}$, $LO3_{1-N}$ to receivers/exciters $16_{1-N}$, as well as clock signals ADC $Clk_{1-N}$ and DAC $Clk_{1-N}$ to ADCs/DACs $18_{1-N}$ in order to achieve a desired performance characteristic of system 10. It should be understood that LO signals $LO1_{1-N}$, $LO2_{1-N}$, $LO3_{1-N}$ may take the form of control signals generated by master reference 20 for controlling operations of LO signal generators or oscillators internal to receivers/exciters $16_{1-N}$. However, in the case of a system comprising oscillators external to receivers/exciters $16_{1-N}$, it should be understood that master reference 20 may be operative to selectively provide LO signals $LO1_{1-N}$, $LO2_{1-N}$, $LO3_{1-N}$ generated either internally therein, or from other external signal generators or oscillators, to receivers/exciters $16_{1-N}$. In embodiments, the illustrated master reference 20 may be replaced with, or may comprise, a plurality of discrete signal generating devices or sources (e.g., a system clock, one or more LOs, processor(s) etc.), without departing from the scope of the present disclosure.

Master reference 20 may be embodied as one or more processors in communication with one or more memory devices (not shown) containing suitable instructions, and/or a user or control interface for performing the operations set forth herein. Master reference 20 may be responsive to a user interface or control interface 28, for example, a computer executing control algorithms that generate real time, dynamic command instructions 29 derived from available 1) real time target return data in the target detection processor 26 or digital signal processor 24, and/or 2) operator provided radar mission data entered into the computer through an input device (e.g., a keyboard). These instructions may include the identification or selection of desired parameters to be used by the system (e.g. desired LO values to be provided to each receiver/exciter). Master reference 20 may also be operative to output instructions 30 to digital signal processor 24, or other downstream processing devices, for commanding suitable back end signal processing for given operational parameters of system 10.

The embodiments are provided by way of example only, and other embodiments for implementing the systems and methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. The above-described processing components (e.g. master reference 20, digital signal processor/beamformer 24, detection processor 26) may be embodied as a single multi-purpose processor, or any other number of discrete processors suitable for performing the described operations without departing from the scope of the present disclosure. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

Figure 2:
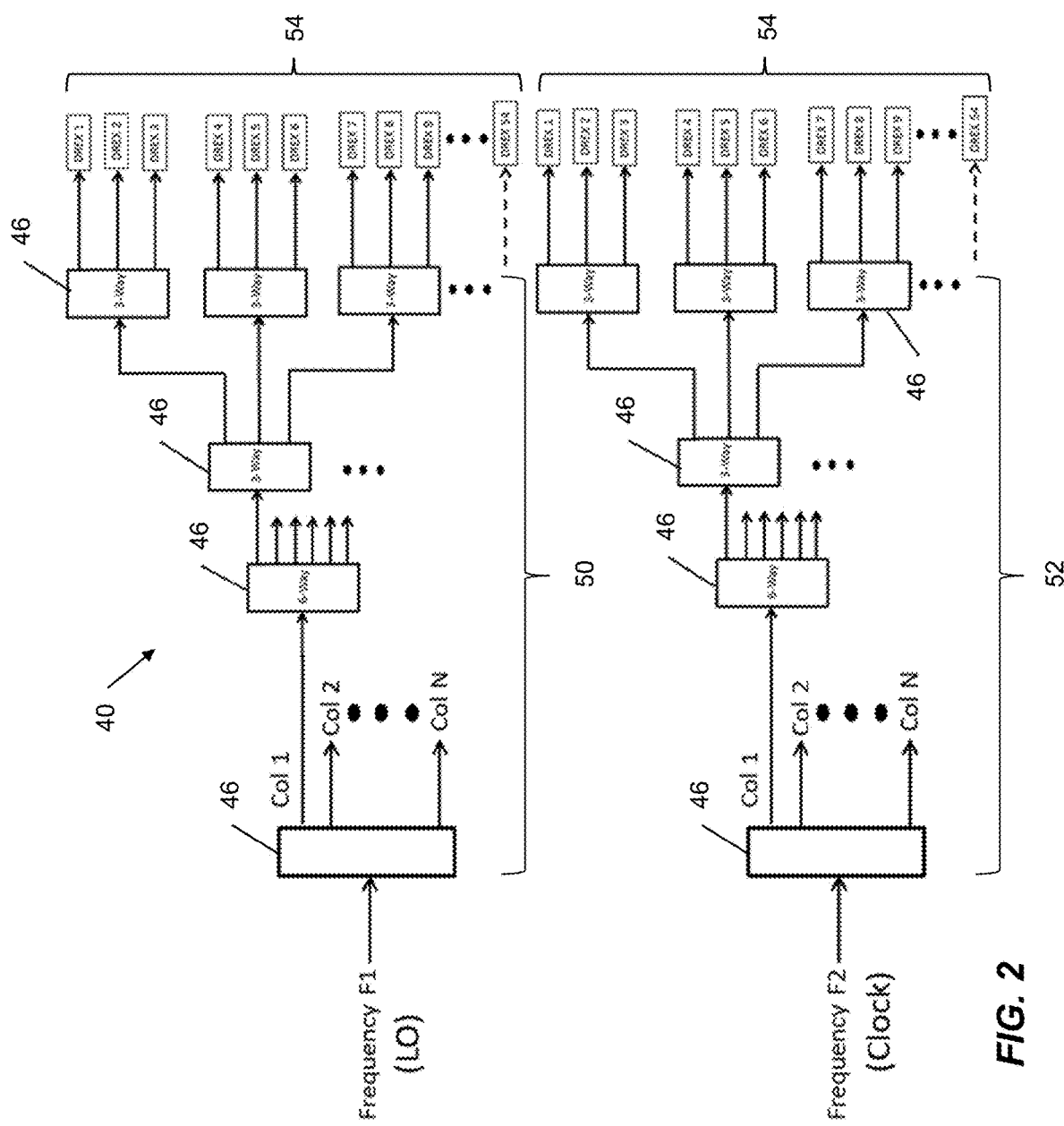
FIG. 2 is a simplified representation of a signal distribution system for use in a phased array radar system according to the prior art.

FIG. 2 illustrates a simplified version of a signal distribution scheme 40 according to the prior art which may be used to distribute signals within a phased array radar system (e.g., the above-described LO and clock signals). As shown in the exemplary embodiment, individual signals are distributed from their respect sources to hardware components (e.g. one or more receivers and/or exciters) via separate and discrete signal channels. More specifically, by way of simplified example only, a first LO signal F1 may be routed and distributed to a plurality of $DREX_{1-54}$ elements 54 via a first distribution channel 50 comprising a plurality of power splitters 46 arranged in both series and parallel. Likewise, a representative clock signal F2 is distributed to $DREX_{1-54}$ elements 54 via a separate and discrete second distribution channel 52, also comprising a plurality of power splitters 46 arranged in both series and parallel for expanding the single clock signal F2 input into a plurality of identical clock signals F2 provided to each $DREX_{1-54}$ elements 54. As set forth above, as each frequency or signal utilizes its own channel, hardware (e.g., physical cables, signal dividers, etc.) and therefor space requirements and costs are significant.

Figure 3:
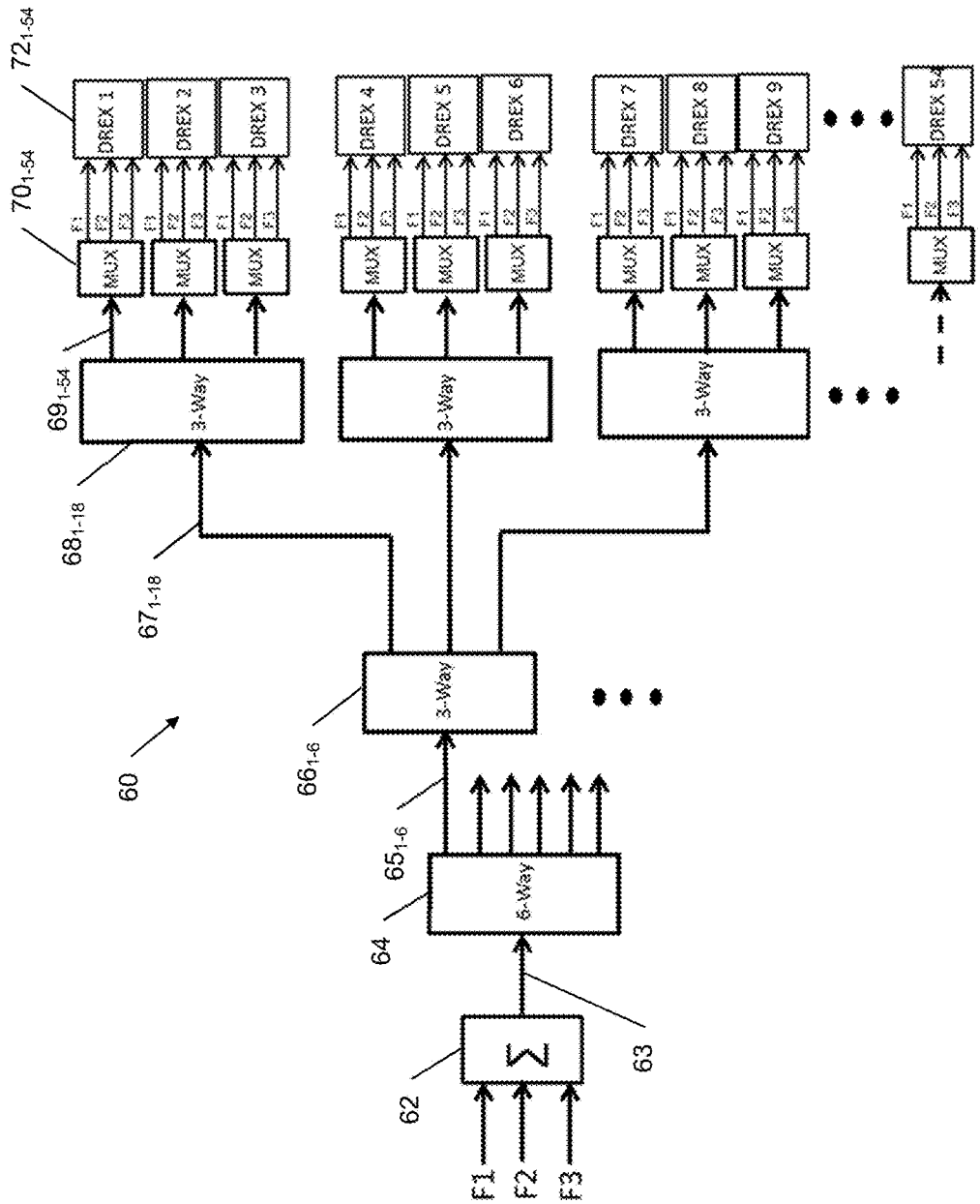
FIG. 3 is a simplified representation of a signal distribution system for use in the phased array radar system of FIG. 1 according to embodiments of the present disclosure.

Embodiments of the present disclosure remedy the above-described shortcomings by implementing frequency multiplexing techniques, wherein a single set of signal dividers and distribution channels (i.e. cables or other signal lines) may be utilized for supplying multiple discrete signals throughout a phased antenna array. Specifically, referring to FIG. 3, in one exemplary embodiment of the present disclosure, multiple input signals F1, F2, F3 (e.g., an ND clock signal, a first LO signal, and a second LO signal generated from one or more signal sources, as set forth above with respect to FIG. 1) are selectively routed onto a single channel or line 63 (e.g. a coaxial cable) via a first multiplexer 62 (in this exemplary embodiment, a triplexer). The resulting channel is split or divided into a desired number of channels via a series of signal dividers or power splitters. In the exemplary embodiment, a first 6-way signal divider 64 is responsive to channel 63 for producing six output channels $65_{1-6}$. A first set of 3-way signal dividers $66_{1-6}$ are arranged in parallel with one another, with each signal divider 66 responsive to a respective output channel 65 for producing output channels $67_{1-18}$. A second set of 3-way signal dividers $68_{1-18}$ are arranged in parallel and responsive to output channels $67_{1-18}$ for producing output channels $69_{1-54}$. Each output channel 69 is operatively connected to a corresponding one of demultiplexers $70_{1-54}$. The output(s) of demultiplexers $70_{1-54}$ are provided to respective DREX elements 72. More specifically, each demultiplexer 70 is configured to selectively route signals received over a respective output channel 69 among three output channels F1, F2, F3 (e.g., a channel for each of signals F1, F2, F3) to one of DREX elements $72_{1-54}$. While the embodiment of FIG. 3 illustrates the consolidation and distribution of three signals F1, F2, F3, it should be understood that any number of signals from any number of input sources may be consolidated and distributed in the described fashion (e.g., the five distinct signals shown in FIG. 1) without departing from the scope of the present disclosure.

As illustrated, embodiments of the present disclosure enable the routing and distribution of a plurality of discrete signals over a single-set of signal dividers, associated cables and other hardware. Accordingly, significant reductions in space requirements, weight, and cost are all realized.

While the foregoing invention has been described with reference to the above-described embodiment, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:
1. A phased array radar system, comprising:
   a first input signal source configured to generate a first input signal, wherein the first input signal comprises a local oscillator (LO) signal indicative of a first frequency;
   a second input signal source configured to generate a second input signal, wherein the second input signal comprises a clock signal of a second frequency, distinct from the first frequency;

a multiplexer operatively connected to the first and second input sources and configured to selectively route the first and second input signals onto a single output channel;
at least one signal dividing device operatively connected to the single output channel and configured to generate a plurality of output signals from a signal received from the signal multiplexer;
a plurality of demultiplexers, each demultiplexer responsive to one of the plurality of output signals for routing the output signal to one of a plurality of output channels; and
at least one of a plurality of receivers and a plurality of exciters operatively connected to the plurality of output channels of one of the plurality of multiplexers.

2. The phased array radar system of claim 1, wherein the at least one of a plurality of receivers and a plurality of exciters comprises a plurality of digital receiver/exciter (DREX) elements.

3. The phased array radar system of claim 1, further comprising a third signal source configured to generate a third input signal, wherein the multiplexer is operatively connected to the third input source and configured to selectively route the first, second and third input signals onto the single output channel.

4. The phased array radar system of claim 3, wherein the third input signal comprises a local oscillator (LO) signal indicative of a second frequency, distinct from the first frequency.

5. A system for distributing signals within a phased array radar system, comprising:
a signal multiplexer comprising a plurality of inputs responsive to a plurality of signal sources, the multiplexer configured to selectively route signals received at the plurality of inputs onto a single output channel, wherein at least one of the plurality of signal sources comprises a source of a first local oscillator (LO) signal indicative of a first frequency, and wherein at least one of the plurality of signal sources comprises a source of a second local oscillator (LO) signal indicative of a second frequency;
at least one signal dividing device operatively connected to the single output channel and configured to generate a plurality of output signals from a signal received from the signal multiplexer; and
a plurality of signal demultiplexers configured to be operatively connected to at least one of a plurality of radar transmitters and a plurality of radar receivers, the plurality of signal demultiplexers responsive to one of the plurality of output signals for routing the output signal to one of a plurality of output channels operatively connected to the at least one of the plurality of radar transmitters and the plurality of radar receivers.

6. The system of claim 5, wherein at least one of the plurality of signal sources comprises a source of a clock signal of a first frequency.

7. A method for distributing signals in a phased array radar system, comprising:
selectively routing a plurality of input signals onto a single output channel via a signal multiplexer, wherein at least one of the plurality of input signals comprises a first clock signal of a second frequency, distinct from the first frequency, and wherein at least one of the plurality of input signals comprises a first clock signal of a second frequency, distinct from the first frequency;
dividing the single output channel into a plurality of output channels via a signal dividing device; and
routing each of the plurality of output channels to one of a plurality of input channels of a plurality of radar receivers via a plurality of signal demultiplexers.

8. The method of claim 7, wherein at least one of the plurality of input signals comprises a second local oscillator (LO) signal of a third frequency, distinct from the first and second frequencies.

* * * * *